Sept. 4, 1923.

W. E. MARSHALL 1,466,667

AUTOMOBILE ATTACHMENT

Filed March 29, 1920  2 Sheets-Sheet 1

Witnesses;

Inventor,
Walker E. Marshall,
By Joshua R. H. Potts
His Attorney

Sept. 4, 1923.
W. E. MARSHALL
AUTOMOBILE ATTACHMENT
Filed March 29, 1920
1,466,667
2 Sheets-Sheet 2
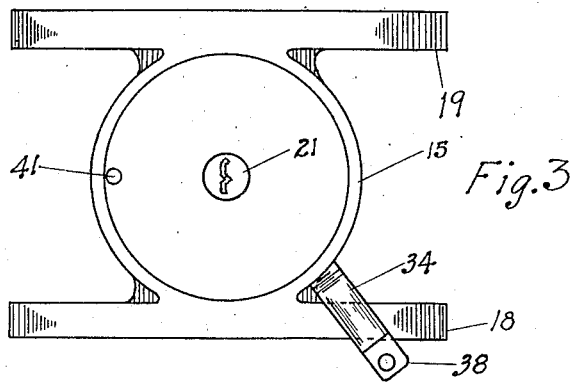
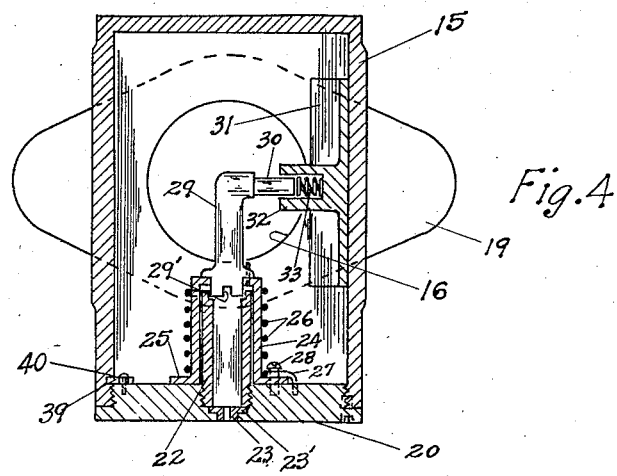
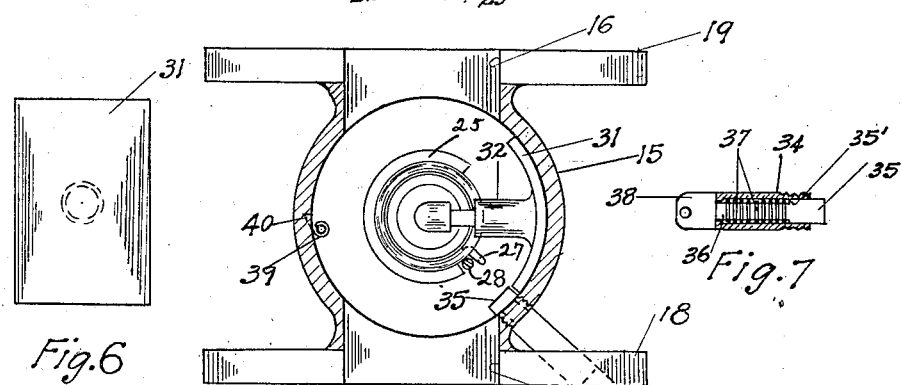
Witnesses,
Inventor,
Walker E. Marshall,
By Joshua H. Dorr
His Attorney.

Patented Sept. 4, 1923.

1,466,667

UNITED STATES PATENT OFFICE.

WALKER E. MARSHALL, OF SPRINGFIELD, OHIO, ASSIGNOR OF FORTY-FIVE PER CENT TO IRA M. EULITT, OF SPRINGFIELD, OHIO.

AUTOMOBILE ATTACHMENT.

Application filed March 29, 1920. Serial No. 369,596.

*To all whom it may concern:*

Be it known that I, WALKER E. MARSHALL, a citizen of the United States, and a resident of the city of Springfield, county of Clark, and State of Ohio, have invented certain new and useful Improvements in Automobile Attachments, of which the following is a specification.

My invention relates to new and useful Improvements in an automobile attachment, and has for its object the provision of a device which will prevent the operation of an automobile without the consent of the owner. Another object is the provision in such an attachment for automobiles of means for closing communication between the manifold and the carburetor of the gasoline engine.

Other objects will appear hereinafter.

The invention consists in the combinations and arrangements of parts hereinafter described and claimed.

Figure 1:
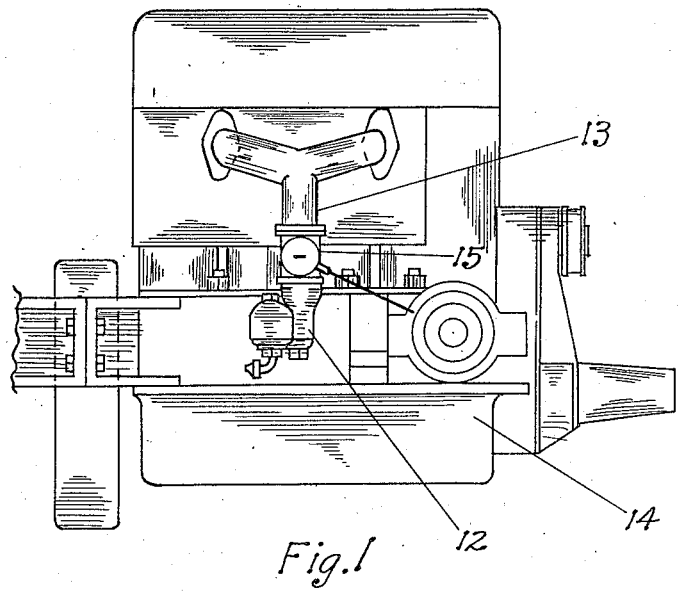
Figure 2:
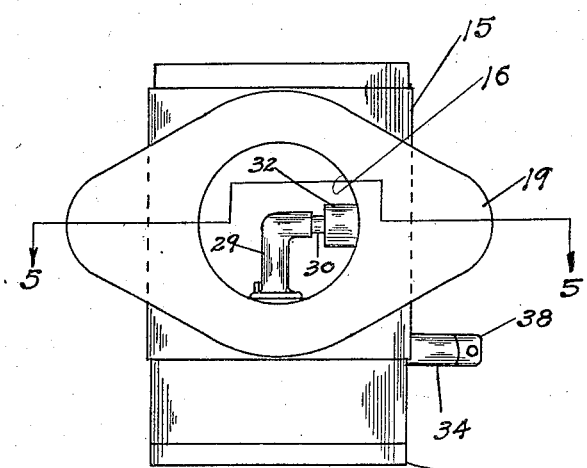

The invention will be best understood by reference to the accompanying drawings forming a part of this specification, and in which, Fig. 1, is a side elevation of a gasoline engine embodying the invention, Fig. 2, a top plan view of the invention, Fig. 3, a side elevational view of the invention, Fig. 4, a longitudinal central sectional view of the invention, Fig. 5, a sectional view taken on substantially line 5—5 of Fig. 2, Fig. 6, a side elevational view of the valve disc used in the invention, and Fig. 7, a side elevational view of the stop used in the invention, showing parts in section.

The invention is designed for use with automobiles, and is preferably interposed in the intake pipe 13 of the manifold of the internal combustion engine, intermediate the manifold and the carburetor 12 of the engine 14. The preferred form of construction comprises a valve casing 15, provided at opposite sides with registering ports 16 and 17. Secured to the casing 15, and preferably made integral therewith, at each of the ports 16 and 17, are securing flanges 18 and 19, respectively, by means of which the devices may be secured to the carburetor 12 and the intake pipe 13 by suitable bolts or by welding the various parts together. As shown in Fig. 4, one side of the casing 15 is open, and is provided with a cap 20 which serves as a closure therefor when threaded into place. The cap 20 is provided with an opening 21 into which is threaded a cylinder or lock barrel 22 in which is positioned suitable tumblers (not shown). A disc 23 is positioned in the opening 21 and rests upon shoulders 23' formed therein, said disc 23 being provided with a suitable key slot in which a key may be inserted, which is designed for co-operation with the tumblers mounted in the drum or barrel 22. Positioned loosely in an embracing position upon the member 22 is a cup-shaped member 24, which is provided at its open end with a flange 25 which rests upon the inner surface of the cap 20. Embracing the member 24, and securely fastened thereto at one end, is a spiral spring 26, the opposite end 27 of which is secured to the cap 20 by means of a pin or screw 28. Securely fastened to the base of the member 24 is an upright extending post 29, the end which is secured to the member 24 having a reduced portion which extends into the interior of said member and is provided with a suitable slot 29' for engagement with the end of the key used to operate the lock. The upper end of the member 29 is provided with an angularly turned arm 30, which engages in a socket 32 formed centrally on an arcuate valve disc 31. As shown, a spiral spring 33 is positioned in the socket of the member 32, so as to contact with the bottom of the socket, and the interior end of the member 30 thereby serving to retain the member 31 in close contact with the inner surface of the casing 15. Threaded into the casing 15, so as to communicate with the interior thereof, is a sleeve 34 in which is slidably positioned a plunger 35 which, when in its normal position, projects into the interior of the casing 15, as shown in Fig. 5. The member 35 is provided intermediate its ends with a reduced portion 36, upon which is positioned a spiral spring 37 which engages at one end the shoulder 35' formed on the member 35, and the shoulder 36 formed on the member 34, thereby serving to retain the member 35 in its outwardly thrust position. The member 35 is provided at the end exterior to the casing 15 with an enlarged portion 38, to which may be attached a suitable rod or cord which may be passed or projected so as to extend above the body of the automobile with which the engine 14 is used, so that the plunger 35 may be operated from above the body of the car.

In use, the casing 15 is mounted as already described and as shown in Fig. 1. When the member 31, or the valve proper, is operative, one of the ports in the casing will be closed, thereby preventing the passage of any explosive fluid from the carburetor to the manifold. In Fig. 5 I have shown the device mounted for closing the port 17. When it is desired to open the port, the key which is specially designed for each particular device, is inserted into the lock drum and the valve turned to the position shown in Fig. 5. Upon the member 31 clearing the point at which the member 35 projects into the casing 15, the member 35, in response to the pressure of the spring 37, assumes the position shown in Fig. 5, thereby retaining the valve member 31 in open or in-operative position. This is the position of the valve when the engine is being used. By attaching a suitable cord or other element, to the member 38, the plunger 35 may be retracted from above the body of the car and the valve 31 will then move into operative position or into such a position as to close the port 17, the valve moving in response to the tension of the spiral spring 26. In this way, I have provided a means whereby the owner of the car may prevent its unlawful use, or its theft, inasmuch as the engine can not be operated until the valve 31 is moved to inoperative position. In order to do this, a key, which will co-operate with the wards mounted in the barrel 22, is necessary. The key, not shown, when properly positioned in the barrel, engages the notch 29' and by a turning movement thereof the valve 31 is rotated to an open position. As shown in Fig. 4, I have provided a pawl 39 upon the cap 20, said pawl being spring-actuated so as to spring into a notch or recess 40 formed in the inner surface of the casing 15. The member 39 is so positioned that the cap 20 may be secured onto the casing but cannot be turned backwardly. I have also projected a screw 41 through the cap 20 and into the casing 15, to further insure the permanency of the connection between the cap 20 and the casing 15.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:—

1. In a fuel controlling means for preventing the operation of an internal combustion engine, comprising a valve casing; aligned ports in said casing; a key barrel centrally mounted on said casing and extending into the interior thereof; a valve stem mounted to rotate on said barrel; a valve carried by said stem for closing one of said ports; and resilient means for normally holding said valve in closed position, substantially as described.

2. In a fuel controlling means for preventing the operation of an internal combustion engine, comprising a valve casing open at one end; a closure member mounted in said open end; means for preventing the removal of said closure member; a key barrel mounted on said closure member and extending into the interior of said casing; a valve stem rotatably mounted on said barrel; a valve carried by said valve stem; and a spring member embracing said valve stem for automatically rotating said valve to closed position, substantially as described.

3. In a fuel controlling means for preventing the operation of an internal combustion engine, comprising a valve casing open at one end; aligned ports in said casing; a closure member for said open end; a key barrel mounted on said closure member and extending into the interior of said casing; a valve stem rotatably mounted on said barrel; a valve carried by said valve stem normally closing one of said ports; and a spring actuated plunger for releasably holding said valve in open position, substantially as described.

4. In a fuel controlling means for preventing the operation of an internal combustion engine, comprising a valve casing open at one end; aligned ports in said casing; a closure member for said open end; a key barrel mounted on said closure member and extending into the interior of said casing; a valve stem rotatably mounted on said barrel; a valve carried by said valve stem; resilient means for normally holding said valve in closed position; and a spring actuated plunger mounted on said valve casing in the path of said valve for releasably holding said valve in open position, substantially as described.

5. In a fuel controlling means, for preventing the operation of an internal combustion engine, the combination with the carburetor and intake manifold of said engine, of a valve casing interposed intermediate said carburetor and said manifold; ports in said casing opening communication between said carburetor and said manifold; a key barrel mounted on said casing and extending into the interior thereof; a flanged cap-shaped member rotatably mounted on said barrel;

an angular-shaped valve stem carried by said member and rotatable therewith; a valve carried by said valve stem; a spring member surrounding said cap-shaped member for automatically rotating said valve; and means for releasably holding said valve in open position, substantially as described.

6. A device of the class described comprising a valve casing having a port therein and open at one end; a cap for said open end of said casing; a lock barrel mounted on said cap and projecting interiorly of said casing; a cup-shaped member rotatably mounted on said barrel; an arm projecting from said barrel; a valve carried by said arm for closing said port; resilient means for moving said valve to operative or closing position; and means for retaining said valve in in-operative position, substantially as described.

7. In a fuel controlling means, for preventing the operation of an internal combustion engine, the combination with the carburetor and intake manifold of said engine, of a valve casing interposed intermediate said carburetor and said manifold; a closure member screw-threaded on said casing; means for preventing the removal of said closure member; aligned ports in said casing opening communication between said carburetor and said manifold; a key barrel mounted on said closure member and extending laterally therefrom; a flanged cap-shaped member rotatably mounted on said barrel; an angular-shaped arm carried by said member; a valve carried by said arm and contacting with said casing; means for automatically rotating said valve in a closed position; and a spring actuated plunger mounted on said casing for releasably holding said valve in open position, substantially as described.

In testimony whereof I have signed my name to this specification in the presence of two subscribing witnesses.

WALKER E. MARSHALL.

Witnesses:
JOHN R. MORSE,
HARRY E. STOUT.